(12) United States Patent
Das et al.

(10) Patent No.: US 9,185,462 B2
(45) Date of Patent: Nov. 10, 2015

(54) METHOD AND SYSTEM FOR IMPLEMENTATION OF AN INTERACTIVE TELEVISION APPLICATION

(75) Inventors: Diptesh Das, Kolkata (IN); Avik Ghose, Kolkata (IN); Priyanka Sinha, Kolkata (IN); Provat Biswas, Kolkata (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 10 days.

(21) Appl. No.: 14/003,904

(22) PCT Filed: May 18, 2011

(86) PCT No.: PCT/IN2011/000347
§ 371 (c)(1),
(2), (4) Date: Sep. 20, 2013

(87) PCT Pub. No.: WO2012/120524
PCT Pub. Date: Sep. 13, 2012

(65) Prior Publication Data
US 2014/0090001 A1     Mar. 27, 2014

(30) Foreign Application Priority Data
Mar. 9, 2011 (IN) .......................... 656/MUM/2011

(51) Int. Cl.
*H04N 5/445* (2011.01)
*H04N 21/4725* (2011.01)
(Continued)

(52) U.S. Cl.
CPC ....... *H04N 21/4725* (2013.01); *H04N 21/4722* (2013.01); *H04N 21/6581* (2013.01); *H04N 21/8586* (2013.01)

(58) Field of Classification Search
CPC ....................... H04N 21/4725; H04N 21/8545

USPC ..................................................... 725/32, 51
See application file for complete search history.

(56) References Cited

U.S. PATENT DOCUMENTS

2002/0188959 A1* 12/2002 Piotrowski ..................... 725/112
2008/0285944 A1* 11/2008 Tsunokawa ...................... 386/83
(Continued)

FOREIGN PATENT DOCUMENTS

GB           2466456 A       6/2010

OTHER PUBLICATIONS

U. Rauschenbach et al., "A scalable interactive TV service supporting synchronized delivery over broadcast and broadband networks," Slides presented at Proceedings of the IBC 2004 conference, Amsterdam, The Netherlands, 17 pages (Sep. 9-13, 2004).
(Continued)

*Primary Examiner* — Nasser Goodarzi
*Assistant Examiner* — Michael Hong
(74) *Attorney, Agent, or Firm* — Finnegan, Henderson, Farabow, Garrett & Dunner, L.L.P.

(57) ABSTRACT

The present invention provides a method and system for implementation of an interactive television application. Particularly, the invention provides method and system for designing and implementation of synchronized interactive television applications using quick response (QR) code, wherein the quick response (QR) code is used to tag the broadcasted television content. More particularly, the invention provides method and system for decoding the quick response (QR) code at the receiver side to provide a universal resource locator (URL) which hosts augmented services for the content on the interactive television as well as on the secondary communication device.

12 Claims, 4 Drawing Sheets

(51) Int. Cl.
*H04N 21/4722* (2011.01)
*H04N 21/658* (2011.01)
*H04N 21/858* (2011.01)

(56) References Cited

U.S. PATENT DOCUMENTS

| | | | |
|---|---|---|---|
| 2009/0108057 A1 | 4/2009 | Mu et al. | |
| 2012/0138671 A1* | 6/2012 | Gaede et al. | 235/375 |
| 2012/0188442 A1* | 7/2012 | Kennedy | 348/441 |
| 2012/0223131 A1* | 9/2012 | Lim et al. | 235/375 |

OTHER PUBLICATIONS

Play Along TV Limited, "SYNC TV Interactive broadcast participation," http://www.ctxd.com/items/synctvsheet.pdf (2006).

Hakola L. et al., "PrintAccess," Graphic Arts in Finland, vol. 34, Iss. 2, pp. 12-59 (2005).

U. Rauschenbach et al., "A scalable interactive TV service supporting synchronized delivery over broadcast and broadband networks," Proceedings of the IBC 2004 conference, Amsterdam, The Netherlands, 8 pages (Sep. 9-13, 2004).

* cited by examiner

METHOD AND SYSTEM FOR IMPLEMENTATION OF AN INTERACTIVE TELEVISION APPLICATION

PRIORITY CLAIM

This U.S. patent application is a National Stage Entry under 35 U.S.C. §271 of International Application No. PCT/IN2011/000347, titled "A METHOD AND SYSTEM FOR IMPLEMENTATION OF AN INTERACTIVE TELEVISION APPLICATION," filed May 18, 2011, which claims the benefit of India Application No. 656/MUM/2011, titled "A METHOD AND SYSTEM FOR DESIGNING AND IMPLEMENTATION OF SYNCHRONIZED INTERACTIVE TELEVISION APPLICATIONS," filed on Mar. 9, 2011, both of which are herein incorporated in their entirety by reference for all purposes.

FIELD OF THE INVENTION

The present invention relates to broadcasting and telecommunications. Particularly the invention provides a novel method of designing and implementation of synchronized interactive television applications. More particularly the invention provides method and system for designing and implementation of synchronized interactive television applications using quick response (QR) code. The invention also extends to decoding the quick response (QR) code at the receiver side to provide a universal resource locator (URL) which hosts augmented services for the content on the interactive television as well as on the secondary communication device.

BACKGROUND OF THE INVENTION

Recent years have witnessed significant improvements in broadcasting, particularly the television broadcasting transitioned from analog to digital. In the current scenario of television broadcast, irrespective of the analog or digital television broadcasting, the interactivity with television is highly required for enhancing subscriber's experience. To be genuinely interactive, the viewer must be able to alter the viewing experience or return information to the broadcaster, wherein the return path, return channel or back channel may use a telephone, mobile SMS (text messages), radio, digital subscriber lines (DSL) or cable.

The quick response (QR) codes have been conventionally used for sending data to mobiles phones as a camera readable 2D bar-code. Furthermore, inserting objects in the video for context extraction by an interactive television application is still a challenge in the technical domain. In order to achieve enhanced interaction of subscriber with television, it is very much required to have quick response (QR) codes that can broadcast video which is not only readable by a camera but also by a video analyzing software module.

Lots of efforts have been made to develop user's interactivity with television using multimedia home platform (MHP) and MPEG-4 (Moving Picture Experts Group). Still there are certain disadvantages associated with the existing technologies, such as the level of interactivity possible with the proposed solution is not achievable using multimedia home platform (MHP).

In multimedia home platform (MHP) based solutions, where the object carousel model is used, the application states are predefined. Hence, for every interaction, the next screen needs to be fetched from the carousel, which is the limiting factor for the interactivity to be in simple predefined states. It may not be possible to support entry of free-form text in such an environment. Other solutions such as enhanced television binary interchange Format (EBIF) and Tru2way are only applicable for cable systems.

In order to achieve tagging the broadcast content for enhancing viewer interactivity and experience with the broadcaster and to have a separate path of interactivity from that of broadcast there is a long felt need to develop a synchronized interactive television application which can work with plurality of customer premise equipment (CPE) as well as secondary communication devices.

However, the existing method and systems are not capable of providing tagged broadcast content for enhancing viewer interactivity and experience with the broadcaster and a separate path of interactivity using interactive television application. Some of them known to us are as follows:

US20090108057 by Mu et al. teaches about the application of quick response (QR) codes with mobile devices for providing interactive applications and services to a user via the mobile devices. The patent doesn't discuss about decoding the quick response (QR) code at set top box (STB), which is not a mobile device and the quick response (QR) code is not scanned using a camera.

WO0158159A1 to Eric E et al. teaches about an interactive content preservation and customization technology which is placed at the broadcast facility to ensure reliable transmission of the interactive content to a local subsystem. The problem addressed particularly by this patent is related to a delivery (head-end) side solution and pertains to reliable delivery of interactive content where the interactive code is used as a bookmark to enter interactive content into the video before broadcasting.

GB2466456 to Loder teaches about an interactive display system which further comprises a processing system for providing information relating to a plurality of selectable elements to a broadcast system and a receiver for receiving from the broadcast system information relating to the plurality of selectable elements. The problem addressed particularly by this patent is related to a system on a television where there are multiple selections available and each selection produces a code which can be communicated over phone by user. It is probably used to build a casino game for interactive television.

Rauschenbach in "A scalable interactive TV service supporting synchronized delivery over broadcast and broadband networks" teaches about various types of portable and mobile multimedia capable terminals available and widely used desire to use them to access TV services and additional content, by way of using smart routing to select the best-suited network allowing inter-network content synchronization.

SYNC TV in "SYNC TV Interactive broadcast participation." provides the vital link that has been missing from broadcast media since its inception: an instant means of response.

Hakola et al. in "Print Access" teaches about the hybrid solutions of the print and electronic media by using printed codes. In the project different code types and their potentiality as PrintAccess codes were investigated. The results showed that the code based integration between the camera phone and printed media are technologically mature and there are opportunities for commercial applications.

The above mentioned prior arts fail to disclose an efficient method and system for designing and implementation of synchronized interactive television applications. The prior art approaches also fail to separate the path of interactivity from that of broadcast.

Thus, in the light of the above mentioned background art, it is evident that, there is a need for such a solution to achieve higher interactivity with television and for improving user's experience. There is a long felt need to develop a synchronized interactive television that can utilize separate path of interactivity from that of broadcast.

OBJECTIVES OF THE INVENTION

In accordance with the present invention, the primary objective of the present invention is to introduce a novel method of designing and implementation of synchronized interactive television applications.

Another objective of the invention is to provide a method and system for designing and implementation of synchronized interactive television applications using quick response (QR) code, wherein the quick response (QR) code is used to tag the broadcasted television content.

Another objective of the invention is to provide a method and system for decoding the quick response (QR) code at the receiver side to provide a universal resource locator (URL) which hosts augmented services for the content.

Another objective of the invention is to provide quick response (QR) code which may remain invisible, yet they may be decoded, by putting the quick response (QR) code in some frames only instead of all frames.

Another objective of the invention is to provide a method and system for enabling the viewer to change their viewing experience or communicate with the broadcaster using a return path (Back Channel).

Another objective of the invention is to provide a separate path of interactivity from that of broadcast by the use of a server connected to the Internet which may be accessible from the customer premise equipment (CPE) devices.

Another objective of the invention is to provide the interactivity that may be carried out in camera enabled second screen devices such as a smart phone, a tablet personal computer or a notebook while the broadcasted content is getting consumed on a television.

Yet another objective of the invention is to provide the quick response (QR) code which may be captured using a camera enabled second screen devices such as a smart phone, a tablet personal computer or a notebook.

Still another objective of the invention is to provide the quick response (QR) code decoding software that may reside in second screen devices such as a smart phone, a tablet personal computer or a notebook, besides television.

SUMMARY OF THE INVENTION

Before the present methods, systems, and hardware enablement are described, it is to be understood that this invention in not limited to the particular systems, and methodologies described, as there can be multiple possible embodiments of the present invention which are not expressly illustrated in the present disclosure. It is also to be understood that the terminology used in the description is for the purpose of describing the particular versions or embodiments only, and is not intended to limit the scope of the present invention.

The present invention provides a novel method of designing and implementation of synchronized interactive television applications.

In one embodiment of the invention a method and system is provided for designing and implementation of synchronized interactive television applications. The invention a method and system is provided for designing and implementation of synchronized interactive television applications using quick response (QR) code, wherein the quick response (QR) code is used to tag the broadcasted television content. The invention also provide a method and system for decoding the quick response (QR) code at the receiver side to provide a universal resource locator (URL) which hosts augmented services for the content. The quick response (QR) code provided by the invention may remain invisible, yet they may be decoded, by putting the quick response (QR) code in some frames only instead of all frames.

In one embodiment of the invention a method and system is provided for enabling the viewer to change their viewing experience or communicate with the broadcaster using a return path (Back Channel). The invention provides a separate path of interactivity from that of broadcast by the use of a server connected to the Internet which may be accessible from the customer premise equipment (CPE) devices. The interactivity that may be carried out in camera enabled second screen devices such as a smart-phone, or a tablet or a notebook while the broadcasted content is getting consumed on a television. The quick response (QR) code may also be captured using the camera enabled second screen devices such as a smart phone, a tablet personal computer or a notebook. The quick response (QR) code decoding software may also reside in second screen devices such as a smart phone, a tablet personal computer or a notebook, besides television.

The above said method and system are preferably for designing and implementation of synchronized interactive television applications but also can be used for many other applications.

BRIEF DESCRIPTION OF THE DRAWINGS

The foregoing summary, as well as the following detailed description of preferred embodiments, are better understood when read in conjunction with the appended drawings. For the purpose of illustrating the invention, there is shown in the drawings exemplary constructions of the invention; however, the invention is not limited to the specific methods and system disclosed. In the drawings.

DETAILED DESCRIPTION OF THE INVENTION

Figure 1:
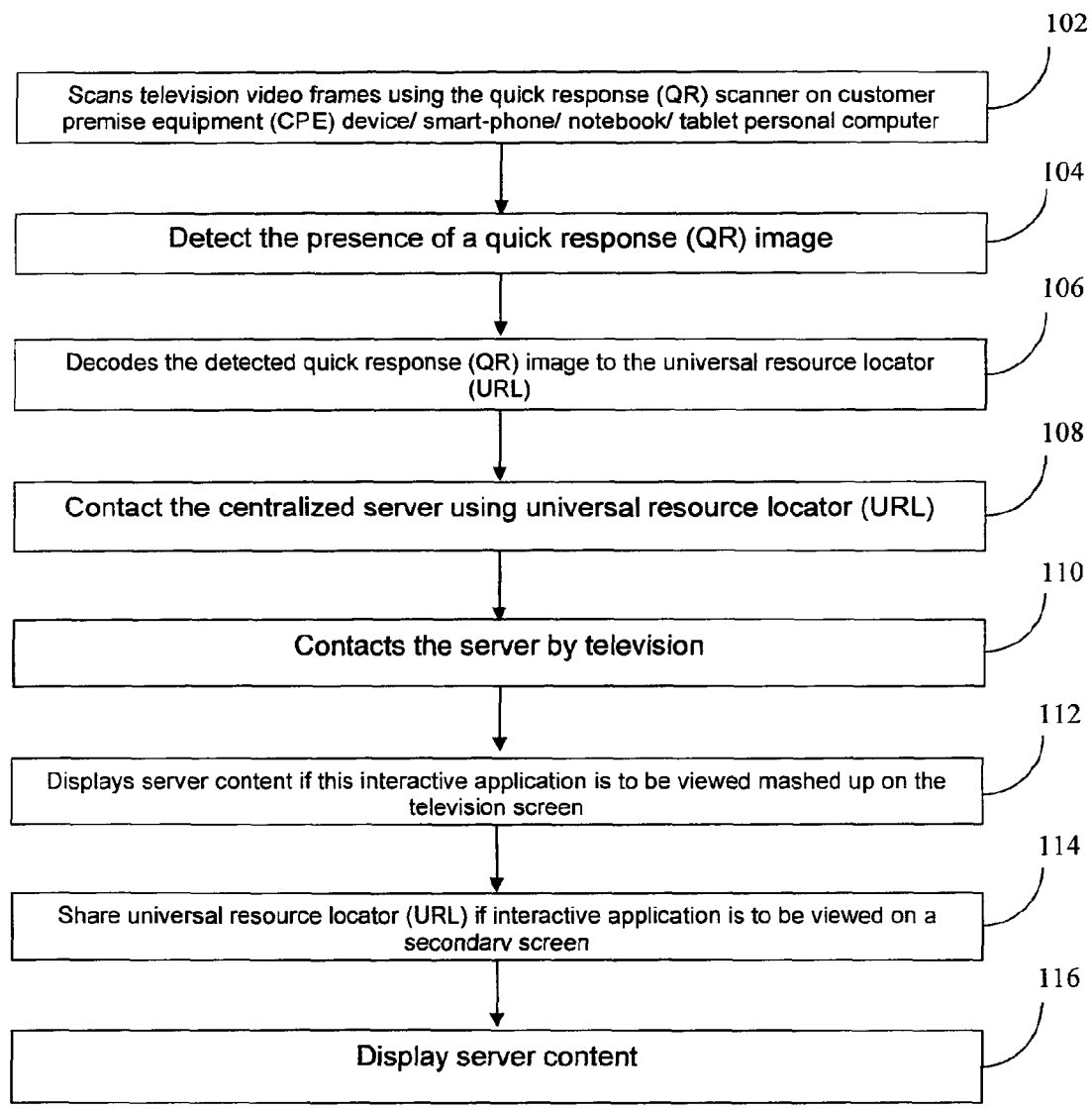
FIG. 1: shows a flow diagram of the process of designing and implementation of synchronized interactive television applications using quick response (QR) code

Some embodiments of this invention, illustrating all its features, will now be discussed in detail.

The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein, the singular forms "a," "an," and "the" include plural references unless the context clearly dictates otherwise. Although any systems and methods similar or equivalent to those described herein can be used in the practice or testing of embodiments of the present invention, the preferred, systems and methods are now described.

The disclosed embodiments are merely exemplary of the invention, which may be embodied in various forms.

The present invention enables a method and system for designing and implementation of synchronized interactive television applications. More particularly the invention provides method and system for designing and implementation of synchronized interactive television applications using quick response (QR) code, wherein the quick response (QR) code is used to tag the broadcasted television content. The invention also extends to decoding the quick response (QR) code at the receiver side to provide a universal resource locator (URL) which hosts augmented services for the content.

The present invention provides a method for implementation of an interactive television application on plurality of digital communication devices, characterized by a broadcasting channel independent interactive communication, facilitating an on demand synchronized viewing experience, the method comprises the processor implemented steps of:
 a. bundling each primary broadcast content with a corresponding secondary information contents through a correspondence matrix, the secondary information contents being hosted at a server accessible through internet;
 b. binding at least one frame of the each primary broadcast contents with a predefined quick response (QR) code, the quick response (QR) codes acting as a unique identifier for the secondary information contents corresponding to the primary broadcasting contents;
 c. receiving at least one primary broadcast content from a broadcaster by at least one broadcast receiver means residing within a customer premise equipment (CPE);
 d. scanning at least one received video frame of the primary broadcast content intermittently;
 e. detecting the presence of at least one quick response (QR) image embedded in at least one scanned video frame of the primary broadcast content;
 f. decoding the detected quick response (QR) image to a universal resource locator (URL) for facilitating interactivity of the viewer with the secondary information content server;
 g. routing the secondary information content request associated with the detected QR code through a secondary communication channel by resolving the URL associated therewith; and
 h. receiving the secondary information content associated with the scanned QR code by viewer, synchronously along with the uninterrupted primary broadcast content, on at least one predefined communication device in at least one predefined format.

The present invention provides a system for implementation of an interactive television application on plurality of digital communication devices, characterized by a broadcasting channel independent interactive communication, facilitating an on demand synchronized viewing experience, the system comprising of:
 a. a plurality of quick response codes associated with plurality of primary broadcast content;
 b. a plurality of primary broadcast content adapted to embedded with a corresponding invisible QR codes;
 c. a server, communicatively coupled with a customer premise equipment (CPE) or a secondary communication device through internet, storing plurality of secondary information contents associated with the primary broadcast content;
 d. correspondence matrix associating each QR code with a corresponding URL for pointing to the secondary contents hosted on the server;
 e. at least one customer premise equipment (CPE) adapted to receive at least one primary broadcast content from a broadcaster, at least one interactive television communicatively coupled with at least one customer premise equipment (CPE) for displaying the primary broadcast content and secondary information content received by the customer premise equipment (CPE); and
 f. at least one secondary communication device communicatively coupled with the secondary information server for displaying the requested secondary content while broadcast content continues to play on the said interactive television.

Referring to FIG. 1 is a flow diagram of the process of designing and implementation of synchronized interactive television applications using quick response (QR) code.

The process starts at the step 102, television video frames are periodically scanned using the quick response (QR) scanner on customer premise equipment (CPE) device, or else user may use his/her smart-phone, notebook or tablet personal computer to get quick response (QR) scanned on demand. At the step 104, the presence of a quick response (QR) image is detected. At the step 106, the detected quick response (QR) image is decoded to the universal resource locator (URL). At the step 108, the centralized server is contacted using universal resource locator (URL). At the step 110, the server may be contacted by the television. At the step 112, server content is displayed, if this interactive application is to be viewed mashed up on the television screen. At the step 114, universal resource locator (URL) is shared, if it interactive application is to be viewed on a secondary screen. The process ends at the step 116, server content is displayed on a secondary screen while broadcast content continues to play on the television screen.

Figure 2:
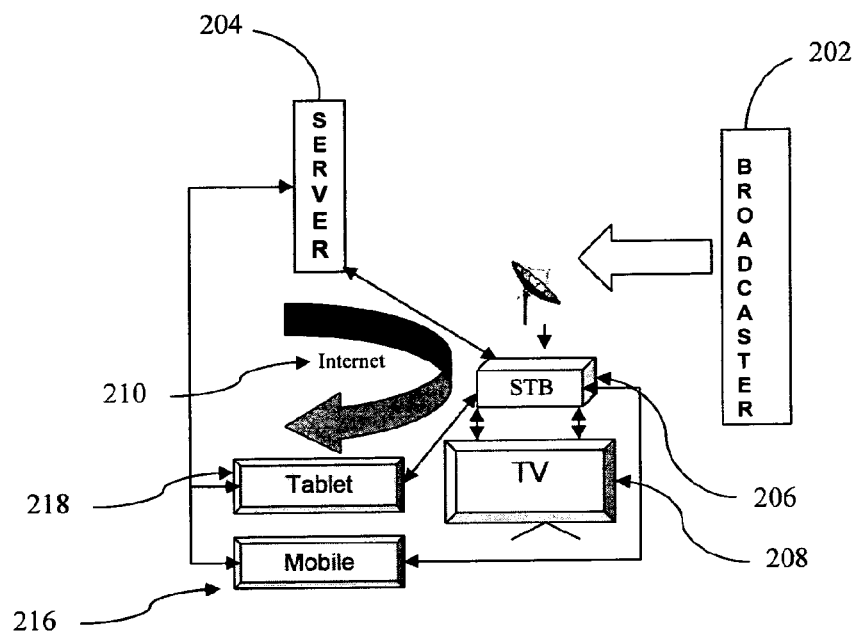
FIG. 2: shows system architecture

Referring to FIG. 2 is system architecture.

The system depicted in FIG. 2 consists of a broadcaster (202) which is connected to a broadcasting television (208) through a set top box (STB) (206). The quick response (QR) code is embedded in the broadcasted content. A server (204) which is in communicates with set top box (STB) (206)/interactive television (208) via the internet (210), serving interactive applications. This connectivity is entirely different than that of the broadcast. The interactive application may reside on the tablet personal computer (218) or a smart mobile phone (216) and communicate with server (204), while the user is watching the broadcasted content on the set top box (STB) (206) or interactive television (208).

In the case of distance learning, the broadcaster (202) is capable of broadcasting the course content. The quick response (QR) code is broadcasted in the video frames wherever interactivity is needed.

Figure 3:
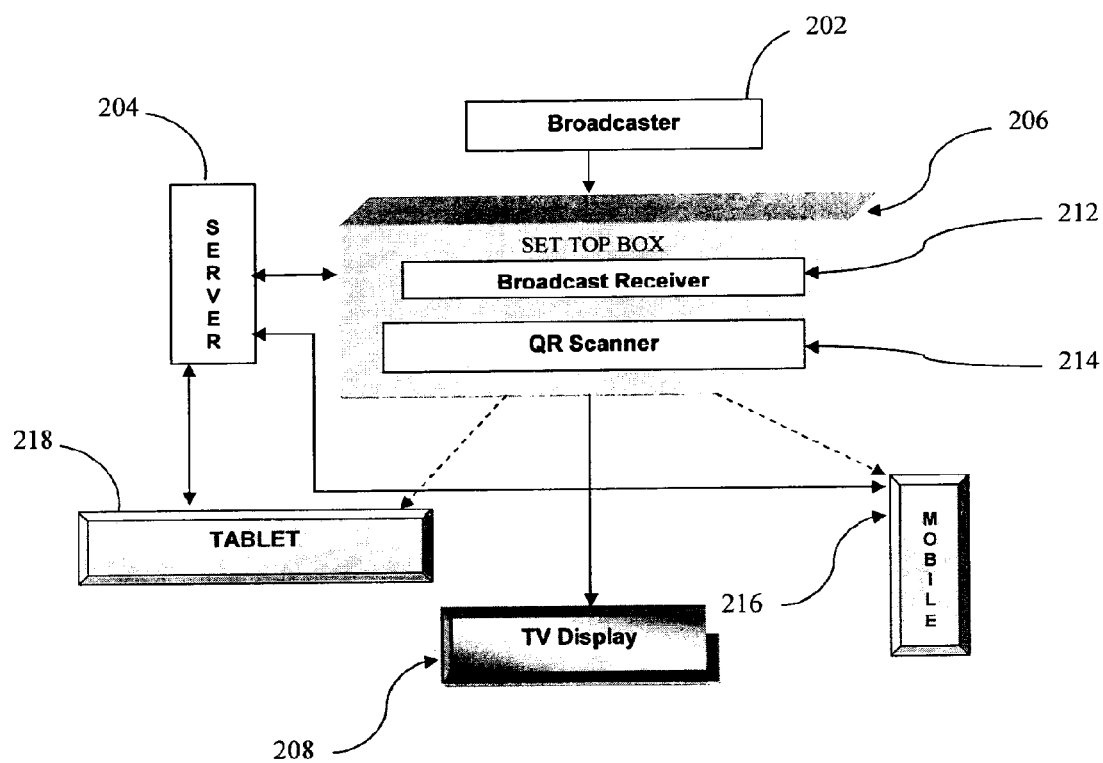
FIG. 3: shows block diagram of the integrated receiver and decoder

Referring to FIG. 3 is a block diagram of the integrated receiver and decoder.

The FIG. 3 represents a block diagram of set top box (STB) (206) side which describes how the broadcast stream is first received by the broadcast receiver (212) that resides within the set top box (STB) (206). This stream is then periodically scanned by the quick response (QR) scanner (214) which is either part of the software program executing inside the set top box (STB) (206) or is residing on an interactivity device like a smart mobile phone (216) or a tablet personal computer (218). The quick response (QR) code may also be captured using a camera enabled second screen devices such as a smart phone (216), a tablet personal computer (218) or a notebook. The quick response (QR) code decoding software may also reside in second screen devices such as a smart phone (216), a tablet personal computer (218) or a notebook, besides television. The quick response (QR) code provided in the present invention may remain invisible, yet they may be decoded, by putting the quick response (QR) code in some frames only instead of all frames. Final output of the system is then displayed on the television screen (208) or perhaps on any secondary screen such as mobile phone (216) or tablet personal computer (218). When the broadcast receiver (212) deciphers the universal resource locator (URL) to an interactive application, it can be displayed either mashed up on the television screen (208) or pushed to a paired mobile phone (216) or tablet personal computer (218).

Figure 4:
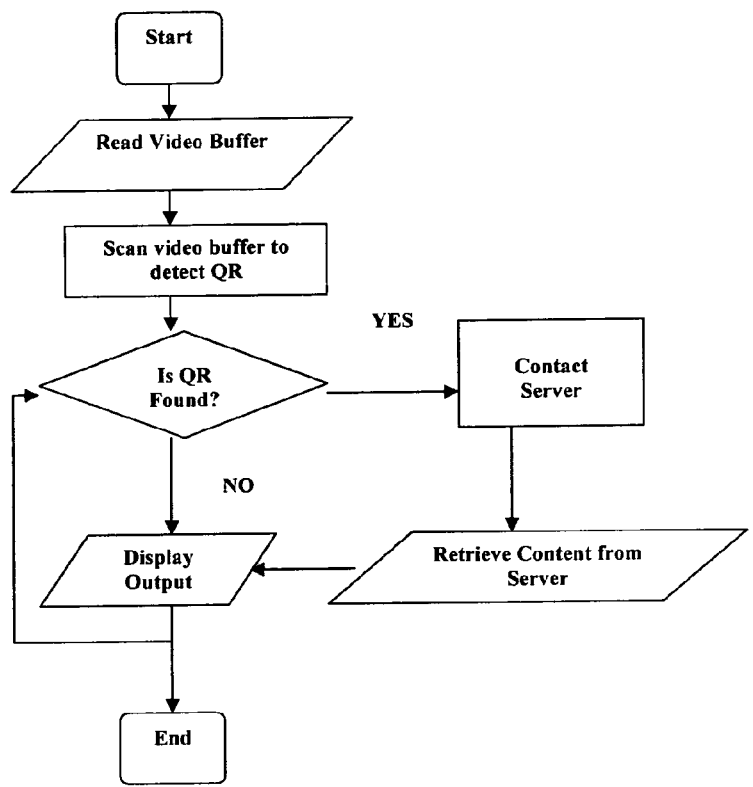
FIG. 4: shows a flow diagram of the distance learning application

Referring to FIG. 4 is a flow diagram of the distance learning application.

Interactivity is introduced by broadcasting information such as a universal resource locator (URL) encoded in a quick response (QR) code. This quick response (QR) code is a 2-D image embedded at a particular pre-defined well-known co-ordinate in the broadcast frame. The quick response (QR) scanner module in the customer premise equipment (CPE) device periodically scans television video frames. Once this module detects the presence of a quick response (QR) image, it decodes this image to the universal resource locator (URL). This universal resource locator (URL) can be used to contact the centralized server. If this interactive app is to be viewed mashed up on the television screen, the television contacts the server and displays server content on its graphics plane. If it is to be viewed on a secondary screen, the universal resource locator (URL) is shared with it and that screen then displays server content while broadcast content continues to play on the television screen.

In the specific application of distance learning, the lesson content being broadcasted as a video from the broadcaster consists of consecutive lessons with a time-gap. In those time gaps between the lessons, an interactive question-answer session is started automatically by the centralized server and is terminated automatically before the start of the next broadcast.

In the distance learning application, the quick response (QR) code is generated using the following data:
- The partial universal resource locator (URL) of a particular web service of the server
- The lesson ID that corresponds to the recently broadcasted lesson.
- The time-stamp which gets refreshed every second.

The decoded quick response (QR) image on the broadcast content consists of the partial universal resource locator (URL), timestamp and lesson ID. The customer premise equipment (CPE) device then constructs the final universal resource locator (URL) using this information and contacts the centralized server. The server verifies the time stamp to maintain synchronization. It then starts the interactive question-answer session corresponding to the lesson ID. It stops this session before the next broadcast starts. If the user finishes before the scheduled broadcast, the user waits.

In case the user changes the channel during a lesson and tunes back, interactivity will not be hampered. This is because the broadcaster is always broadcasting the latest quick response (QR) code. Thus, the scanning module will be able to pick up the latest quick response (QR) image. This image contains the updated status of the streaming content. This will remain true even if the user comes back a few minutes after the start of question-answer session. The application may choose to allow a user to take the test that has already been started.

Advantages of The Invention
- The present invention provides interactive television applications which are directly linked to the content and do not require any add-on data like Broadcast Markup Language feeds to be transferred with the content.
- The present invention links the broadcaster directly to the end-customer. The broadcaster need not go through the service provider in order to bring interactivity. The interactivity comes through a piece of software installed on the decoding device which directly communicates with the broadcasters' interactive content on the Internet.
- The present invention allows highly dynamic synchronized content with broadcast Media which is possible due to the dynamic nature of the internet.

We claim:

1. An interactive television application method, comprising:
   scanning a video frame of a broadcast content via a communication device;
   detecting presence of a quick response image in the video frame, wherein the quick response image is embedded by a broadcaster in the video frame and the quick response image comprises a time stamp, a universal resource locator (URL) and a content identifier, and wherein the quick response image is updated by the broadcaster over a period of time by updating the time stamp, the URL and the content identifier;
   decoding, via the communication device, the quick response image to obtain the universal resource locator for facilitating synchronous interactivity with a content server to access an information content;
   receiving the information content associated with the quick response image using the universal resource locator; and
   synchronizing the information content interactively with the broadcast content based upon the time stamp and the content identifier, and wherein the time stamp is updated at a time interval and the content identifier corresponds to currently transmitted information content in order to maintain synchronous interactivity between the broadcast content and the information content.

2. The method of claim 1, wherein the quick response image is a two-dimensional image embedded in the video frame of the broadcast content at a pre-defined co-ordinate.

3. The method of claim 1, wherein the content server hosts augmented services related to the information content.

4. The method of claim 1, wherein the quick response image is in an invisible mode.

5. The method of claim 1, wherein the communication device is selected from a group consisting of: a set top box, a smart-phone, a notebook; and a tablet personal computer.

6. An interactive television content provision method, comprising:
   synthesizing, via a computer, a broadcast content to embed a quick response image in a video frame of the broadcast content, wherein the quick response image comprises a time stamp, a universal resource locator (URL) and a content identifier, and wherein the quick response image is updated over a period of time by updating the time stamp, the URL and the content identifier, and wherein the time stamp is updated at a time interval and the content identifier corresponds to currently transmitted information content hosted on a content server, in order to maintain synchronous interactivity between the broadcast content and the information content;
   associating the quick response image with the universal resource locator for pointing to the information content; and
   providing synthesized broadcast content.

7. The method of claim 6, wherein the quick response image is scanned and detected using a camera enabled device.

8. An interactive television system, comprising a communication device configured to:
   receive a broadcast content comprising a video frame;

scan the broadcast content to detect presence of a quick response image in the video frame;

detect presence of the quick response image in the video frame, wherein the quick response image is embedded by a broadcaster in the video frame and the quick response image comprises a time stamp, a universal resource locator (URL) and a content identifier, and wherein the quick response image is updated by the broadcaster over a period of time by updating the time stamp, the URL and the content identifier;

decode the quick response image to obtain the universal resource locator for accessing information content hosted on a content server;

access the information content from the content server using the universal resource locator; and synchronize the information content with the broadcast content interactively based upon the time stamp and the content identifier, and wherein the time stamp is updated at a time interval and the content identifier corresponds to currently transmitted information content in order to maintain synchronous interactivity between the broadcast content and the information content; and display the information content along with the broadcast content.

9. The system of claim 8, wherein the quick response image is a two-dimensional image embedded in the video frame at a pre-defined co-ordinate.

10. The system of claim 8, wherein the quick response image is decoded to obtain the universal resource locator, derived from a correspondence matrix that hosts augmented services for the information content.

11. The system of claim 8, wherein the quick response image is in an invisible mode.

12. The system of claim 8, wherein the communication device is selected from a group consisting of: a set top box, a smart-phone, a notebook, and a tablet personal computer.

\* \* \* \* \*